(No Model.)

A. ALMSTROM.
SEED PLANTER.

No. 421,888. Patented Feb. 25, 1890.

Witnesses.
A. Ruppert
H. A. Daniels

Inventor:
August Almstrom
Per
Thomas P. Simpson,
Atty.

UNITED STATES PATENT OFFICE.

AUGUST ALMSTROM, OF SCRANTON, KANSAS.

SEED-PLANTER.

SPECIFICATION forming part of Letters Patent No. 421,888, dated February 25, 1890.

Application filed July 16, 1889. Serial No. 317,660. (No model.)

*To all whom it may concern:*

Be it known that I, AUGUST ALMSTROM, a citizen of the United States, residing at Scranton, in the county of Osage and State of Kansas, have invented certain new and useful Improvements in Seed-Planters; and I do hereby declare the following to be a full, clear, and exact description of the invention, such as will enable others skilled in the art to which it appertains to make and use the same.

This invention relates to seed-planters; and it consists in certain improvements in the construction of the same, as hereinafter shown and claimed.

Figure 1:
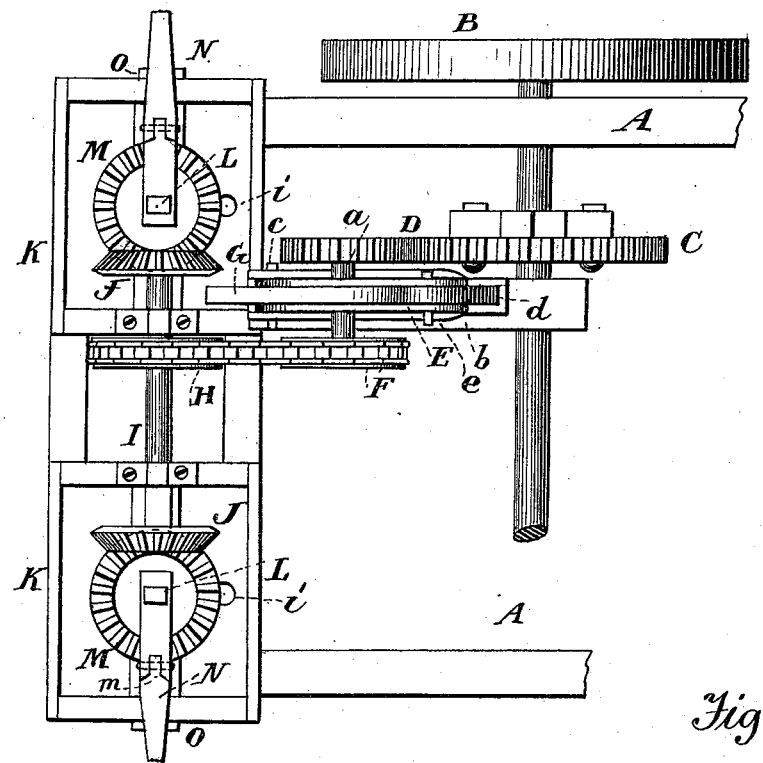
Figure 2:
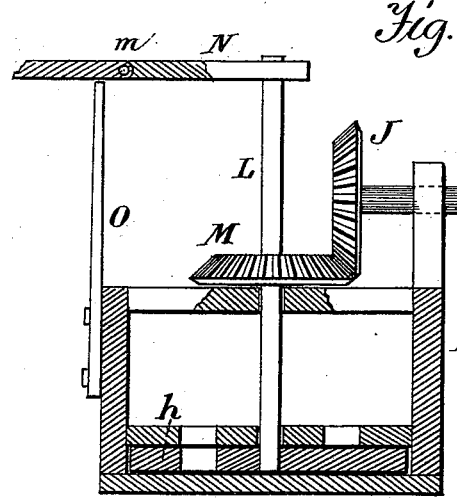
Figure 4:
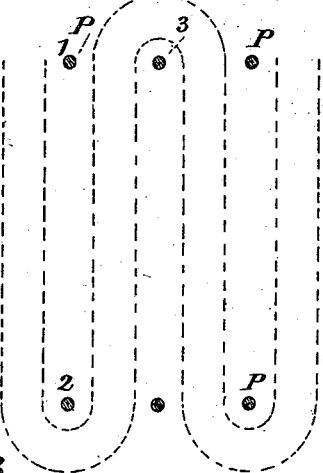
Figure 3:
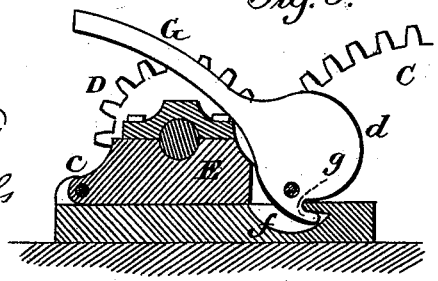

In the accompanying drawings, Figure 1 is a plan view of a seed-planter provided with my improvements. Fig. 2 is a vertical section of one of the seed-boxes and its connections. Fig. 3 illustrates the devices for throwing the planting mechanism out of gear. Fig. 4 illustrates the use of the guide-staffs.

A designates the frame of the planter, and B the carrying-wheels, on the axle of which is fixed a gear-wheel C.

D indicates a gear-wheel, which connects with the wheel C, and is mounted on one end of a short rotative shaft $a$, which is mounted in a movable bearing E, a chain-wheel F being placed on the opposite end of said shaft $a$. The movable bearing E rests in a groove or seat formed for it in the base $b$, which is fastened to the frame, said movable bearing being connected with the rear end of the base by a hinge-coupling $c$. The bearing E has a lever G, pivoted to its forward end at $e$, said lever being provided at its pivoted end with a cam form $d$ and a projection or catch $g$. When the movable bearing rests in its seat in the base $b$ and the lever G is turned backward, the catch $g$ projects into a recess $f$ in the base, and the parts are secured with the planting mechanism in gear. When it is desired to throw the mechanism out of gear, the operator lifts the lever G and moves it forward, and the catch $g$ is thus withdrawn from the recess $f$ and the bearing is raised on its coupled end, taking the wheel D out of connection with the wheel C.

H indicates a chain-wheel mounted on a shaft I and connected by an endless chain with the chain-wheel F on the shaft $a$. The shaft I has bearings which are mounted on or adjacent to the seed-boxes K and carries two beveled gear-wheels J, one being secured to said shaft at each end.

In each of the seed-boxes K is supported a vertical rotative shaft L, to the lower end of which is secured a seed-wheel $h$, which rotates with said shaft and takes the seed to a discharge-aperture $i$. On each shaft L is mounted a beveled gear-wheel M, which is engaged by one of the beveled gear-wheels J on the shaft I, rotary motion being imparted through said gearing to shafts L and the seed-wheels $h$. To the upper extremity of each of the shafts L is fixed a horizontal hand or indicator N, for the purposes hereinafter stated. To the outer side of each of the seed-boxes K is fastened a vertical staff O, these staffs and the shafts L being all on the same straight line. The seed-boxes and their connections are so constructed that seed is dropped just when the indicators N in their rotation are directly over the staffs O.

P indicates the guide-staffs, which are used in connection with the indicators N.

When the machine is in position to start—say at the right side of the field—a staff P is set in the ground, so that it will stand at the point of the indicator N, which is on the left or inward side of the machine, as indicated at 1 in Fig. 4. The machine is then driven along the side of the field to the opposite end, when it is stopped, the indicators N extending outward directly over the staffs O, which are fastened to the seed-boxes. The lever G is then raised and turned forward, putting the mechanism out of gear. Another guide-staff P is then set in the ground at the point of the indicator toward the left, as indicated at 2. The machine is then turned around, its track being indicated by dotted lines, and the last-named indicator is still held with its point to the staff at 2. The planting mechanism is then put in gear and the machine is driven to the opposite end of the field, bringing the indicator N at the left side of the machine to the guide-staff which was first set. Another guide-staff is then set at the point of the other indicator, as indicated at 3, the machine is turned around, and the operation is continued as before.

Two guide-staffs P are usually used at each end of the field, one of said staffs being shifted at the end of each passage over the field. By the use of the guides in connection with the indicators the operation of the planter is rendered accurate, whether the field is rectangular or irregular in form.

The indicators N are each provided with a hinge-joint at *m*, so that they may be turned up out of the way when the planter is being driven through narrow passages or close to fences or other structures.

I claim—

1. In a planting-machine, the combination, with the seed-boxes provided with seed-wheels, of the vertical shafts connected with the seed-wheels, each of said shafts being provided with a horizontal indicator, a vertical staff fastened to each of the seed-boxes, and a number of guide-staffs, substantially as and for the purposes described.

2. The combination, with the seed-boxes K, provided with seed-wheels, of the vertical shafts L, provided with indicators N, which are provided with hinge-joints *m*, and vertical staffs O, fastened to the seed-boxes, substantially as set forth and described.

In testimony whereof I have affixed my signature in presence of two witnesses.

AUGUST ALMSTROM.

Witnesses:
P. E. GREGORY,
S. H. FULLER.